United States Patent
Parker et al.

(10) Patent No.: US 8,784,039 B2
(45) Date of Patent: Jul. 22, 2014

(54) VARIABLE GEOMETRY TURBINE

(75) Inventors: John F. Parker, Huddersfield (GB);
Jeremy Jose Fonseca, Ramsbottom (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 553 days.

(21) Appl. No.: 13/056,904

(22) PCT Filed: Jul. 27, 2009

(86) PCT No.: PCT/GB2009/001854
§ 371 (c)(1),
(2), (4) Date: Jan. 31, 2011

(87) PCT Pub. No.: WO2010/012992
PCT Pub. Date: Feb. 4, 2010

(65) Prior Publication Data
US 2011/0135449 A1    Jun. 9, 2011

(30) Foreign Application Priority Data

Jul. 30, 2008 (GB) .................................. 0813874.5

(51) Int. Cl.
| F03B 11/08 | (2006.01) |
| F02B 37/22 | (2006.01) |
| F01N 3/021 | (2006.01) |
| F02B 37/24 | (2006.01) |
| F01D 17/16 | (2006.01) |
| F02B 39/16 | (2006.01) |

(52) U.S. Cl.
CPC ............... *F02B 37/22* (2013.01); *Y02T 10/20* (2013.01); *F05D 2220/40* (2013.01); *Y02T 10/144* (2013.01); *F01N 3/021* (2013.01); *F02B 37/24* (2013.01); *F01D 17/167* (2013.01); *F02B 39/16* (2013.01); *F01N 2340/06* (2013.01); *F01D 17/165* (2013.01); *F05D 2260/607* (2013.01)
USPC ........................................................ 415/121.2

(58) Field of Classification Search
USPC ....................................................... 415/121.2
See application file for complete search history.

(56) References Cited

U.S. PATENT DOCUMENTS

| 3,362,629 | A | * | 1/1968 | Papapanu .................. 415/200 |
| 4,066,552 | A | * | 1/1978 | Caine ......................... 210/304 |
| 4,236,868 | A | * | 12/1980 | Linhardt ................... 415/121.2 |
| 5,522,697 | A | * | 6/1996 | Parker et al. ................. 415/158 |
| 5,868,552 | A | | 2/1999 | McKean et al. |
| 6,655,409 | B1 | | 12/2003 | Steenburgh et al. |
| 7,052,532 | B1 | | 5/2006 | Liu et al. |
| 2002/0174648 | A1 | | 11/2002 | Minami |
| 2004/0031262 | A1 | | 2/2004 | Gui et al. |
| 2005/0060999 | A1 | | 3/2005 | Mulloy et al. |
| 2005/0262841 | A1 | * | 12/2005 | Parker ........................... 60/602 |
| 2007/0283693 | A1 | * | 12/2007 | Mulloy et al. ................. 60/598 |
| 2008/0089782 | A1 | * | 4/2008 | Parker et al. ................. 415/150 |

FOREIGN PATENT DOCUMENTS

| EP | 0 654 587 | 5/1995 |
| EP | 1 435 434 | 7/2004 |
| GB | 1 281 408 | 7/1972 |
| JP | 2007 077965 | 3/2007 |
| WO | WO 2007/031752 A1 | 3/2007 |

OTHER PUBLICATIONS

International Search Report, PCT/GB2009/001854, European Patent Office, Cummins Turbo Technologies Limited, Oct. 21, 2010.
United Kingdom Search Report, GB0813874.5, UK Intellectual Property Office, Cummins Turbo Technologies Limited, Nov. 27, 2008.

* cited by examiner

*Primary Examiner* — Edward Look
*Assistant Examiner* — Wayne A Lambert
(74) *Attorney, Agent, or Firm* — Krieg DeVault LLP; Clifford W. Browning

(57) ABSTRACT

A variable geometry turbine comprising: a housing; a turbine wheel supported within said housing for rotation about a turbine axis; an annular inlet passage within said housing upstream of said turbine wheel and defined between respective radial inlet surfaces of first and second wall members; an outlet passage within said housing downstream of said turbine wheel; an array of vanes extending across the inlet passage, said vanes being connected to said first wall member; at least one of said first and second wall members being moveable along the turbine axis to vary the size of the inlet passage and/or at least one of said vanes being rotationally moveable about an axis that is substantially parallel to said turbine axis to vary the size of the inlet passage; wherein at least one particulate filter is provided within said housing at a location such that said particulate filter can be contacted by particulate matter flowing through said turbine during use.

9 Claims, 6 Drawing Sheets

VARIABLE GEOMETRY TURBINE

CROSS-REFERENCE TO RELATED APPLICATIONS

The present application is a §371 national stage patent application of PCT/GB2009/001854 filed Jul. 27, 2009, which claims priority to United Kingdom Patent Application No. 0813874.5 filed Jul. 30, 2008, each of which is incorporated herein by reference.

The present invention relates to a variable geometry turbine, such as a variable geometry turbocharger and particularly, but not exclusively, a variable geometry turbine for use in a diesel powered internal combustion engine. The present invention also relates to a nozzle ring for use in a variable geometry turbine.

Turbochargers are well known devices for supplying air to the intake of an internal combustion engine at pressures above atmospheric pressure (boost pressures). A conventional turbocharger essentially comprises a housing in which is provided an exhaust gas driven turbine wheel mounted on a rotatable shaft connected downstream of an engine outlet manifold. Rotation of the turbine wheel rotates a compressor wheel mounted on the other end of the shaft. The compressor wheel delivers compressed air to the engine intake manifold. The turbocharger shaft is conventionally supported by journal and thrust bearings, including appropriate lubricating systems.

In known turbochargers, the turbine stage comprises a turbine chamber within which the turbine wheel is mounted; an annular inlet passage defined between facing radial walls arranged around the turbine chamber; an inlet arranged around the inlet passage; and an outlet passage extending from the turbine chamber. The passages and chambers communicate such that pressurised exhaust emissions, including gaseous and particulate species, admitted to the inlet chamber flows through the inlet passage to the outlet passage via the turbine and rotates the turbine wheel. It is also known to improve turbine performance by providing vanes, referred to as nozzle vanes, in the inlet passage so as to deflect gas flowing through the inlet passage towards the direction of rotation of the turbine wheel.

Turbines may be of a fixed or variable geometry type. Variable geometry turbines differ from fixed geometry turbines in that the size of the inlet passage can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the annular inlet passage. Turbochargers provided with a variable geometry turbine are referred to as variable geometry turbochargers.

In one known type of variable geometry turbine, an array of axially extending vanes is connected to one wall of the annular inlet passage so as to extend across the inlet passage. The separation of the wall carrying the vanes and the facing wall of the inlet passage is fixed. In this type of turbine, commonly referred to as a "swing vane" turbine, the size of the inlet passage is controlled by varying the angle of the vanes relative to the direction of gas flow through the turbine inlet.

In another known type of variable geometry turbine, an axially moveable wall member, generally referred to as a "nozzle ring", defines one wall of the inlet passage. The position of the nozzle ring relative to a facing wall of the inlet passage is adjustable to control the axial width of the inlet passage. Thus, for example, as gas flow through the turbine decreases, the inlet passage width may be decreased to maintain gas velocity and optimise turbine output.

The nozzle ring may be provided with vanes which extend into the inlet and through slots provided in a "shroud" defining the facing wall of the inlet passage to accommodate movement of the nozzle ring. Alternatively vanes may extend from the fixed facing wall and through slots provided in the nozzle ring.

Typically the nozzle ring may comprise a radially extending wall (defining one wall of the inlet passage) and radially inner and outer axially extending walls or flanges which extend into an annular cavity behind the radial face of the nozzle ring. The cavity is formed in a part of the turbocharger housing and accommodates axial movement of the nozzle ring. The flanges may be sealed with respect to the cavity walls to reduce or prevent leakage flow around the back of the nozzle ring. In one common arrangement the nozzle ring is supported on rods extending parallel to the axis of rotation of the turbine wheel and is moved by an actuator which axially displaces the rods. Other arrangements are known.

Nozzle ring actuators can take a variety of forms, including pneumatic, hydraulic and electric and can be linked to the nozzle ring in a variety of ways. The actuator will generally adjust the position of the nozzle ring under the control of an engine control unit (ECU) in order to modify the airflow through the turbine to meet performance requirements.

One example of a variable geometry turbocharger of this general type is disclosed in EP 0654587. This discloses a nozzle ring as described above which is additionally provided with pressure balancing apertures through its radial wall. The pressure balancing apertures ensure that pressure within the nozzle ring cavity is substantially equal to, but always slightly less than, the pressure applied to the nozzle ring face by gas flow through the inlet passage. This ensures that there is only a small unidirectional force on the nozzle ring which aids accurate adjustment of the nozzle ring position, particularly when the nozzle ring is moved close to the opposing wall of the inlet to reduce the inlet passage towards its minimum width.

In addition to the conventional control of a variable geometry turbocharger in an engine fired mode (in which fuel is supplied to the engine for combustion) to optimise gas flow, it is also known to take advantage of the facility to minimise the turbocharger inlet area to provide an engine braking function in an engine braking mode (in which no fuel is supplied for combustion) in which the inlet passage is reduced to smaller areas than in a normal fired mode operating range.

Engine brake systems of various forms are widely fitted to vehicle engine systems, in particular to compression ignition engines (diesel engines) used to power large vehicles such as trucks. The engine brake systems may be employed to enhance the effect of the conventional friction brakes acting on the vehicle wheels or, in some circumstances, may be used independently of the normal wheel braking system, for instance to control down hill speed of a vehicle. With some engine brake systems, the brake is set to activate automatically when the engine throttle is closed (i.e. when the driver lifts his foot from the throttle pedal), and in others the engine brake may require manual activation by the driver, such as depression of a separate brake pedal.

With a variable geometry turbine, the turbine inlet passage may be "closed" to a minimum flow area when braking is required. The level of braking may be modulated by control of the inlet passage size by appropriate control of the axial position of the nozzle ring. In a "fully closed" position in an engine braking mode the nozzle ring may in some cases abut the facing wall of the inlet passage. In some exhaust brake systems known as decompression brake systems, an in-cylinder decompression valve arrangement is controlled to release compressed air from the engine cylinder into the exhaust system to release work done by the compression process. In such systems closure of the turbine inlet both increases back pressure and provides boost pressure to maximise compression work.

It is important to allow some exhaust gas flow through the engine during engine braking in order to prevent excessive heat generation in the engine cylinders. Thus there must be provision for at least a minimum leakage flow through the turbine when the nozzle ring is in a fully closed position in an engine braking mode. In addition, the high efficiency of modern variable geometry turbochargers can generate such high boost pressures even at small inlet widths that use an engine braking mode can be problematic as cylinder pressures can approach or exceed acceptable limits unless counter measures are taken (or braking efficiency is sacrificed). This can be a particular problem with engine brake systems including a decompression braking arrangement.

An example of a variable geometry turbocharger which includes measures for preventing generation of excessive pressures in the engine cylinders when operated in an engine braking mode is disclosed in EP 1435434. This discloses a nozzle ring arrangement provided with bypass apertures that provide a bypass path that opens when the nozzle ring approaches a closed position to allow some exhaust gas to flow from the turbine inlet chamber to the turbine wheel through the nozzle ring cavity thereby bypassing the inlet passage. The bypass gas flow does less work than gas flowing through the inlet passage so that with the bypass passage open the turbine efficiency drops preventing excessive pressure generation within the engine cylinders. In addition, the bypass gas flow can provide, or contribute to, the minimum flow required to avoid excessive heat generation during engine braking.

It is also known to operate a variable geometry turbocharger in an engine fired mode so as to close the inlet passage to a minimum width less than the smallest width appropriate to normal engine operating conditions in order to control exhaust gas temperature. The basic principle of operation in such an "exhaust gas heating mode" is to reduce the amount of airflow through the engine for a given fuel supply level (whilst maintaining sufficient airflow for combustion) in order to increase the exhaust gas temperature. This has particular application where a catalytic exhaust after-treatment system is present.

Catalytic exhaust after-treatment system performance is directly related to the temperature of the exhaust gas that passes through it. For desired performance the exhaust gas temperature must be above a threshold temperature (typically lying in a range of about 250° C. to 370° C.) under all engine operating conditions and ambient conditions. Operation of the after-treatment system below the threshold temperature range will cause the after-treatment system to build up undesirable accumulations of particulate matter, particularly carbonaceous particulate matter (elemental carbon and other organic carbon-based species commonly referred to generically as "soot"), which must be burnt off in a regeneration cycle to allow the after-treatment system to return to designed performance levels. In addition, prolonged operation of the after-treatment system below the threshold temperature without regeneration will disable the after-treatment system and cause the engine to become non-compliant with government exhaust emission regulations.

In some conditions, such as light load conditions and/or cold ambient temperature conditions, the exhaust gas temperature will be below the threshold temperature. In such conditions the turbocharger can in principle be operated in an exhaust gas heating mode to reduce the turbine inlet passage width with the aim of restricting airflow thereby reducing the airflow cooling effect and increasing exhaust gas temperature.

A further option for regeneration of a catalytic exhaust after-treatment system is to inject fuel directly into the exhaust gas stream. This however suffers from the obvious disadvantage of increasing fuel consumption and thereby reducing the fuel efficiency of the engine.

The above problems with exhaust gas heating mode operation of a variable geometry turbocharger are addressed in US published patent application No. US2005/060999A1. This teaches using the turbocharger nozzle ring arrangement of EP 1435434 (mentioned above) in an exhaust gas heating mode. The bypass gas path is arranged to open at inlet passage widths smaller than those appropriate to normal fired mode operation conditions but which are appropriate to operation in an exhaust gas heating mode. As in braking mode, the bypass gas flow reduces turbine efficiency thus avoiding high boost pressures which might otherwise counter the heating effect. In addition to the bypass gas path, pressure balancing apertures (as taught in EP 0654587 mentioned above) may be provided to aid control of the nozzle ring position in an exhaust gas heating mode.

It can also be difficult to ensure that there is always an optimum minimum flow through the turbine when the nozzle ring is in a fully closed position.

It has been observed that particulate matter, such as soot, derived from the exhaust emissions flowing through the turbine can become deposited at various locations throughout the housing in which the turbine, turbine shaft and associated bearings, and compressor wheel are located. Over time, particulate deposits can build up to undesirably high levels and affect the performance and efficiency of the turbine. As mentioned above, many variable geometry turbines include structures to facilitate a bypass gas flow around the turbine inlet passage when the nozzle ring is in a closed position as taught, for example, in EP 1435434. Moreover, turbines incorporating a moveable annular wall member may be provided with pressure balancing holes as described in EP 0654587. Additionally, in certain designs of turbine the pressure balancing holes are combined with a bypass passage structure, for example as disclosed in EP 1435434. While the provision of bypass gas flow passages and pressure balancing holes can improve the performance of variable geometry turbines under many different operating conditions, the provision of such structures exposes turbine components outside of the turbine inlet passage, such as nozzle ring actuator rods, bushes, sealing rings and the nozzle ring cavity, to exhaust emissions, which can result in the accumulation of particulate matter on these components. The build up of deposits on these components could potentially lead to sticking and/or a reduction in the available stroke of the nozzle ring.

It is an object of the present invention to obviate or mitigate one or more of the problems set out above.

According to a first aspect of the present invention there is provided a variable geometry turbine comprising:
 a housing;
 a turbine wheel supported within said housing for rotation about a turbine axis;
 an annular inlet passage within said housing upstream of said turbine wheel and defined between respective radial inlet surfaces of first and second wall members;

an outlet passage within said housing downstream of said turbine wheel;

an array of vanes extending across the inlet passage, said vanes being connected to said first wall member;

at least one of said first and second wall members being moveable along the turbine axis to vary the size of the inlet passage and/or at least one of said vanes being rotationally moveable about an axis that is substantially parallel to said turbine axis to vary the size of the inlet passage;

wherein at least one particulate filter is provided within said housing at a location such that said particulate filter can be contacted by particulate matter flowing through said turbine during use.

The above mentioned problems associated with the build up of particulate deposits within turbine and turbochargers housings are addressed by the provision of at least one particulate filter (i.e. a component or material which filters particulate matter from an emission stream and facilitates the conversion of said particulate matter to other species, e.g. fluids, such as gases, like carbon dioxide and water vapour, which are less likely than the original particulate matter to accumulate to undesirably high levels) within the housing in which the turbine and associated components are received. It should be appreciated that the particulate filter of the present invention is provided as an additional component to the basic components found in a typical variable geometry turbine, such as elements of the turbine housing, turbine wheel or shaft, or the actuators required to vary the geometry of the turbine. No such components or combinations of components are envisaged as being encompassed within the "particulate filter" of the present invention. By way of example, while it is anticipated that some features of a typical turbine, e.g. the cavity behind a moveable wall member, might inadvertently entrap small amounts of particulate matter flowing past during use of the turbine, which may then be burnt off as operating temperature exceed the threshold temperature required to oxidise the entrapped particulates, the "particulate filter" of the present invention should not be construed to encompass conventional components of a turbine which may inadvertently or accidentally function in this way occasionally.

The particulate filter(s), such as blocks of diesel particulate filter (DPF) material, capture particulate matter entrained with exhaust emissions flowing through housing and then facilitates oxidation of the particulate matter to less harmful fluid (e.g. gaseous) species, such as carbon dioxide and water. A contributing factor to the filter(s) being able to function in this way is that the or each filter holds at least some of the captured particulate matter away from the cooler surfaces of the turbine housing and closer to the warmer exhaust emissions passing the filter. This not only increases the average temperature of the captured particulate matter but, possibly more importantly, exposes the particulate matter to higher peak temperatures during operation of the turbine so that the particulate matter is at least periodically exposed to temperatures in excess of a threshold temperature required to convert it to less harmful substances, such as carbon dioxide and water vapour. In certain applications, during use, the exhaust emissions contacting the particulate filter(s) will often be at a sufficiently high temperature to enable conversion of the particulate matter to one or more fluids to take place. In this case the particulate filter(s) will be continually converting particulate matter to fluids, which can then more easily flow out of the housing, thereby avoiding the problems associated with of the build up of particulate deposits within the turbine.

It will also be appreciated that locating a particulate filter further upstream in the exhaust emission flow path (i.e. closer to the engine) than in conventional exhaust systems of turbocharged engines may reduce or even completely remove the requirement for a conventional diesel particulate filter further downstream. As mentioned above, conventional diesel particulate filters often require periodic regeneration to ensure satisfactory long-term operation. Providing a particulate filter further upstream, where exhaust emission temperatures are typically higher, may therefore also remove or at least reduce the frequency of downstream filter regeneration processes that are currently required, which may reduce engine fuel consumption in systems that employ periodic fuel injection into the exhaust system to burn off particulate deposits.

According to a second aspect of the present invention there is provided a nozzle ring for a variable geometry turbine, said nozzle ring comprising:

a radial wall defining a first radial surface and a second opposite radial surface, an array of vanes extending from said first radial surface;

radially inner and outer axially extending flanges which, together with the second radial surface, define an annular space behind the first radial surface;

wherein a particulate filter is provided in said annular space.

It will be appreciated that provision of a particulate filter within the annular space behind the nozzle ring enables any particulate matter passing into the space, for example via balancing holes in the radial wall of the nozzle ring and/or radial flow path apertures in the axial flanges of the nozzle ring, to be converted to other species which can then pass out from behind the nozzle ring more easily than the original particulate matter, thus reducing or removing the likelihood of such particulate matter accumulating to undesirably high levels behind the nozzle ring. It will also be appreciated that the nozzle ring according to the second aspect of the present invention may be of the "swing vane" type or the axially moveable type as discussed in more detail above.

A third aspect of the present invention provides a variable geometry turbine comprising a nozzle ring according to the second aspect of the present invention.

A fourth aspect of the present invention provides a turbocharger comprising a variable geometry turbine according to the first or third aspects of the present invention.

With regard to the first aspect of the present invention the at least one particulate filter may be connected to the first or second wall member. Preferably the particulate filter(s) is/are connected to the first wall member. The first wall member may define a further radial surface opposite to said radial inlet surface. The radial surface that faces into and in part defines the annular radial inlet passage of the turbine may be considered as a front surface, in which case the opposite further radial surface may be considered a rear surface. Although exhaust emissions passing through the inlet passage primarily contact the front surface of the first wall member, exhaust emissions carrying particulate matter can also pass behind the first wall member via a number of different flow paths, e.g. via balancing holes, where such particulate matter can accumulate and disrupt the operation of the first wall member. It is thus preferred that said at least one particulate filter is connected to said further radial surface.

In a preferred embodiment the first wall member comprises at least one axially extending flange which extends rearward, away from said inlet passage and towards said housing, said at least one flange defining a space behind the first wall member in which said at least one particulate filter is provided. It is preferred that the first wall member defines a radially outer axially extending flange and a radially inner axially extending flange, which preferably extend rearwards over a similar axial distance. The or each particulate filter may be dimensioned to occupy any desirable proportion of the volume available within the space behind the radial wall of the first wall member which is defined by the radial wall and axially extending flange(s) of the first wall member. It is preferred that the at least one particulate filter is dimensioned to occupy at least around 10% of the volume of said space. It is particularly preferred that the particulate filter(s) occupy a significant proportion of the space to maximise the operational effectiveness of the particulate filter(s), for example they may occupy at least around 50%, more preferably at least around 75%, and still more preferably at least around 90% of the volume of said space. Most preferably the particulate filter(s) occupy substantially all of the volume of the available space behind the radial wall of the first wall member.

In a further preferred embodiment of the first aspect of the present invention the first wall member is moveable along the turbine axis to vary the size of the inlet passage and said first wall member defines at least one axially extending flange which extends into a cavity defined by the housing behind the radial inlet surface of the first wall member, said at least one particulate filter being provided in said cavity. In this embodiment, the at least one particulate filter may be dimensioned to occupy at least around 10% of the volume of the space available inside said cavity remaining after receipt of said first wall member within said cavity. More preferably said at least one particulate filter may be dimensioned to occupy at least around 50% of that volume, still more preferably at least around 75% of that volume, and most preferably at least around 90% of the volume of space available inside said cavity remaining after receipt of said first wall member within said cavity. It is particularly preferred that the particulate filter(s) occupy substantially the entire volume of the space available within said cavity. The cavity is preferably defined by one or more surfaces of the housing and said at least one particulate filter may be connected to at least one of said surfaces.

Said at least one axially extending flange may define one or more radially extending apertures to define a radial flow path for exhaust emissions to flow behind the radial inlet surface of the first wall member, i.e. through the space between the first wall member and the housing, during use. Said at least one particulate filter may define one or more first openings arranged to radially overlie said one or more radially extending apertures such that said radial flow path extends through said first openings. The first openings thus afford a means by which exhaust emissions can flow substantially undisturbed into the particulate filter(s). The one or more first openings may be in fluid communication with one or more first channels defined by the at least one particulate filter such that said radial flow path extends along said first channel(s). Said one or more first channels may extend through said at least one particulate filter such that said radial flow path extends through said at least one particulate filter thereby facilitating more even distribution of the exhaust emissions throughout the structure of the particulate filter(s) and improve the efficiency of the conversion process.

Said at least one particulate filter may radially overlie said one or more radially extending apertures such that said at least one particulate filter is disposed in said radial flow path. In this way, exhaust emissions passing through the radially extending aperture(s) will immediately contact an exterior surface of the particulate filter.

In addition or alternatively to connecting the particulate filter(s) to the radial wall of the first wall member, said at least one particulate filter may be connected to said at least one axially extending flange. Where radially inner and outer flanges are provided, the particulate filter(s) may be connected to either one, or both, of these flanges.

Additionally or alternatively, the radial inlet surface of said first wall member may define one or more axially extending apertures which define an axial flow path for exhaust emissions to flow through the first wall member during use. The at least one particulate filter may define one or more second openings arranged to axially overlie said one or more axially extending apertures such that said axial flow path extends through said second openings. Said one or more second openings may be in fluid communication with one or more second channels defined by the at least one particulate filter such that said axial flow path extends along said channel(s). Said one or more second channels may extend through said at least one particulate filter such that said axial flow path extends through said at least one particulate filter. Said at least one particulate filter may be provided behind said one or more axially extending apertures such that said at least one particulate filter is disposed in said axial flow path.

As mentioned above, at least one particulate filter may be secured to one of the first and second wall members which define the turbine inlet passage, for example a moveable wall member supporting a plurality of axial vanes, commonly referred to as a nozzle ring, or a surface of an axial cavity in which such a moveable wall member is received during use. Additionally or alternatively, at least one particulate filter may be connected to a section of the housing which is upstream of the inlet passage of the turbine, for example an inlet flange connected to the inlet passage of the turbine. Furthermore, at least one particulate filter may be connected to a section of the housing which at least partially defines the outlet passage of the turbine, such as an outlet flange connected to the outlet passage of the turbine. Moreover, the at least one particulate filter may be provided adjacent to a seal, such as a sealing ring, located between at least one, more preferably both, of the axially extending flanges of the nozzle ring and a respective radially overlying surface of the housing. Preferably the or each filter is axially adjacent to its respective seal. Each seal and filter pair may be received in an annular groove defined by the housing. Each seal may be retained wholly within said annular groove, or may extend radially inwardly out of the groove and into a space between the respective flange and overlying surface of the housing. In one preferred embodiment, said filter extends across the full radial width of the space so as to contact its respective flange.

As defined above, the second aspect of the present invention provides a nozzle ring for a variable geometry turbine in which at least one particulate filter is provided in an annular space defined behind a radial face of the nozzle ring.

The particulate filter may be connected to said second radial surface, said radially inner axially extending flange and/or said radially outer axially extending flange.

Concerning the second aspect of the present invention each of said axially extending flanges may define one or more radially extending apertures configured such that, in use, said radially extending apertures define a radial flow path for exhaust emissions to flow behind the first radial surface. Said at least one particulate filter may define one or more first openings arranged to radially overlie said one or more radially extending apertures such that said radial flow path extends through said first openings. Said one or more first openings may be in fluid communication with one or more first channels defined by the at least one particulate filter such that said radial flow path extends along said first channel(s). Said one or more first channels may extend through said at least one particulate filter such that said radial flow path extends through said at least one particulate filter.

Said at least one particulate filter may radially overlie said one or more radially extending apertures such that said particulate at least one filter are disposed in said radial flow path.

Additionally or alternatively, the radial wall of the nozzle ring of the second aspect of the present invention may define one or more axially extending apertures configured such that, in use, said axially extending apertures define an axial flow path for exhaust emissions to flow through the radial wall. Said at least one particulate filter may define one or more second openings arranged to axially overlie said one or more axially extending apertures such that said axial flow path extends through said second openings. Said one or more second openings may be in fluid communication with one or more second channels defined by the at least one particulate filter such that said axial flow path extends along said channel(s). Said one or more second channels may extend through said at least one particulate filter such that said axial flow path extends through said at least one particulate filter. Said at least one particulate filter may be provided behind said one or more axially extending apertures such that said at least one particulate filter is disposed in said axial flow path.

In a further preferred embodiment of the present invention the at least one particulate filter may be provided adjacent to a seal, such as a sealing ring, located between at least one, more preferably both, of the axially extending flanges of the nozzle ring and a respective radially overlying surface of the housing. Preferably the or each filter is axially adjacent to its respective seal. Each seal and filter pair may be received in an annular groove defined by the housing. Each seal may be retained wholly within said annular groove, or may extend radially inwardly out of the groove and into a space between the respective flange and overlying surface of the housing. In one preferred embodiment, said filter extends across the full radial width of the space so as to contact its respective flange.

Any suitable means may be employed for connecting the particulate filter(s) to the first wall member (e.g. the nozzle ring of the second aspect) or the housing in which the turbine is received. By way of example, said at least one particulate filter may be secured to said first wall member and/or the housing a fastener (e.g. a screw, rivet, stake or the like), a retaining member (e.g. a clip, such as a circlip, plate or the like) and/or surface formation (e.g. one or more projections or recess, such as a series of ribs) provided on the first wall member, housing surface and/or particulate filter(s) to afford a friction fit between these components. A retaining member in the form of one or more clamping plates could be used to keep the filter(s) in place. It will be appreciated that the or each clamping plate may have a similar area to that of the filter it overlies and thereby covers substantially the whole rear surface of the filter, or the or each clamping plate may have a smaller area and so only cover a portion of the rear surface of the filter. Conversely, a single clamping plate or ring could be used which overlies and retains two or more filters.

Exemplary methods for fastening the particulate filter(s) to the first wall member include the use of one or more double-headed fasteners (e.g. rivets) which are located within apertures in the particulate filter material with one head of the fastener overlying and abutting the rear surface of the filter material (i.e. the surface facing the turbine housing) and the other head of the fastener overlying and abutting the front surface face of the first wall member (i.e. the surface that faces into and partly defines the annular radial inlet passage of the turbine).

The rear surface of the first wall member may be provided with one or more bolt bosses for receipt of bolts driven through the filter material or through preformed apertures in the filter material from the rear surface of the filter material. Typically, a conventional washer would be received between the head of each bolt and the rear surface of the filter material.

Another exemplary method employs rearwardly projecting bosses, pins or the like which are connected to the rear surface of the first wall member and project towards the turbine housing. The or each projection is received by a complementary aperture defined by the filter material and a retaining ring (e.g. a snap-ring), finger nut or the like located over the rearmost end of each projection so as to overlie and abut the rear surface of the filter material. In another example, a similar arrangement can be used but with the retaining ring or finger nut being replaced with one or more barbs or the like which extend radially outwardly from its respective projection. In this example, provided the filter material is sufficiently flexible, the filter material can be pressed over the or each projection and its associated barb so as to locate the filter material in the clearance defined between the barb(s) and the rear surface of the first wall member.

In further exemplary embodiments, projections extending radially inwardly from the axially extending flanges of the first wall member may be used to keep the filter(s) in place against the rear surface of the first wall member. The projections may take any appropriate size or shape provided they do not prevent the filter(s) being inserted into the clearance between the projections and the rear surface of the first wall member and are sufficiently large and/or appropriately shaped to keep the filter(s) in place once in position. That being said, it will be appreciated that fixing means, such as rivets, screws, retaining rings, brazing or the like, may be required in addition to the aforementioned radially inwardly directed projections to ensure the filter(s) is (are) securely maintained in place during operation of the turbine.

The projections may be in the form of tabs, fingers, beads or the like which project radially inwardly from one or both of the inner and outer axially extending flanges of the first wall member. The projections may also be defined by one or more retaining rings received within circumferential grooves defined by the inner surfaces of the outer and/or inner flanges of the first wall member. One or more additional supporting members may be located in between the retaining ring(s) and the filter(s) to ensure the filter(s) is (are) secured in place. The supporting members may take any suitable form, but by way of example, may constitute a U-cross section annular ring dimensioned to be received within the radial clearance defined between the inner and outer flanges of the first wall member. The middle section of the U-shaped member may overlie and abut the rear surface of the filter(s) and the upstanding sections either side of the middle section may extend rearwardly, approximately parallel to the flanges of the first wall member, and their tips engage the retaining ring(s).

Another way to ensure the filter(s) is (are) securely held in place is to provide a braze at the interface between the first wall member and the filter(s). This could be achieved by applying a braze to one or more of the rear surface, inner flange and outer flange of the first wall member and then locating the filter(s) in the correct position. Braze beads could also be applied to the inner and/or outer flanges spaced rearwardly from the rear surface of the first wall member so as to be positioned near to the rear surface of the filter(s) once in position. Brazing could also be used to connect a retaining ring to the filter(s), after which the filter(s) with rings applied could then be press-fitted into place against the rear surface of the first wall member. Rather than using retaining rings, the or each filter could simply be dimensioned so as to be slightly larger than the clearance into which it is intended to be received and then the filter(s) compressed and press-fitted into the clearance so as to be held in place by the pressure exerted on the filter(s) by the first wall member.

The aforementioned methods for fixing the filter(s) to the first wall member can be substituted or supplemented with the following methods which are suitable for use with first wall members provided with peripheral pressure balancing holes extending through the radially extending wall of the first wall member (which interconnects the inner and outer flanges). In such cases, the filter material can be drawn through one or more of the balancing holes so as to form a friction fit and then, optionally, other fasteners used to secure the filter(s) in place. The filter material passed through the balancing holes can be drawn sufficiently far through the holes so as to extend beyond the front surface of the first wall member and the exposed sections of the filter material then flattened against the front surface of the first wall member. The exposed sections may also be provided with preformed barbs or the like such that, following insertion through the balancing holes, the barbs overlie and abut the front surface of the first wall member and thereby retain the remainder of the filter material, to which the barbs are connected, against the rear surface of the first wall member. Additionally or alternatively, the filter(s) may be provided in the form of plugs of filter material which are dimensioned so as to be insertable into the balancing holes in the first wall member and retained in place by friction and/or a braze or the like.

The or each particulate filter may be provided in any desirable size and/or shape to suit a particular application as will be evident from the following description of various preferred embodiments of the present invention. Where a plurality of particulate filters are provided, each filter may be made from the same material(s) and have the same size and shape, or each filter may be different in terms of material(s) and/or physical form.

Said at least one particulate filter may comprise a high surface area material. Preferably said high surface area material has a surface area of at least around 200 $mm^2/g$, more preferably at least around 500 $mm^2/g$ and most preferably a surface area of around 300 to 1000 $mm^2/g$. In some applications it may be advantageous to employ filters possessing even higher surface areas, such as up to around 1500 to 2000 $mm^2/g$. The high surface area material may possess a surface area that is sufficiently high to facilitate aerial oxidation of particulate matter deposited on said high surface area material, with or without the need for the provision of a catalyst within the particulate filter(s). The surface area of the high surface area material may be sufficiently high to facilitate aerial oxidation of particulate matter at a temperature of at least around 200° C., or to facilitate aerial oxidation of particulate matter at a temperature of around 250° C. to 400° C.

Said at least one particulate filter may comprise a metallic material and/or ceramic material. Suitable metallic materials include iron and nickel based alloys, such stainless steel and hastalloys respectively. Suitable ceramic materials include magnesium based ceramic materials, such as cordierite-like materials.

Said at least one particulate filter may comprise a catalytic material suitable to catalyse the conversion of particulate matter into one or more different species including one or more fluids.

The catalytic material may additionally comprise a material adapted to convert non-particulate matter (e.g. fluids, including engine exhaust gases, such as carbon monoxide (CO), and nitrogen oxides (NOx where x is an integer, e.g. x=1 or 2) and liquids) passing through the housing and contacting the catalyst into other, less undesirable, species (e.g. carbon dioxide ($CO_2$), water ($H_2O$), nitrogen ($N_2$) and oxygen ($O_2$)). By way of example, the catalytic material may comprise a catalyst of the kind currently employed in conventional catalytic converters, such as a transition metal species (e.g. a platinum group metal), with or without a washcoat containing, for example, silica and/or alumina, applied to the material supporting the catalyst. The catalytic material may incorporate one or more alkali metal (e.g. potassium, caesium etc), alkaline earth metal (e.g. magnesium, strontium etc), transition metal, lanthanide or actinide (e.g. iron, cobalt, cerium etc), or compounds (e.g. oxides, nitrates etc) or combinations thereof. For example, the catalytic material may include one of more compound or alloy selected from the group consisting of MgO, $CeO_2$, $CO_3O_4$, $Sr(NO_3)_2$, Co—Sr, Co—Sr—K, Co—$KNO_3$—$ZrO_2$, $K_2Ti_2O_5$, Co—$ZrO_2$ and the like.

The at least one particulate filter may comprise a carbonaceous particulate filter, that is, a component or material that is capable of converting carbon based particulate matter into other species which can flow out of the turbine more easily and thereby reduce the likelihood of undesirable sooty deposits developing. By way of example, the carbonaceous particulate filter may comprise a catalyst suitable to catalyse the conversion of carbonaceous material to gaseous carbon dioxide and water. A particularly suitable particulate filter comprises a Diesel Particulate Filter (DPF) catalyst material.

Preferably said at least one particulate filter is configured to support captured particulate matter away from an adjacent surface of the housing. Additionally or alternatively, it is preferred that said at least one particulate filter is configured to support captured particulate matter in or adjacent to further particulate matter flowing through the turbine during use. In this way, the or each filter can hold captured particulate matter away from cooler surfaces of the turbine housing upon which the particulate matter would otherwise accumulate and/or closer to the warmer exhaust emissions flowing past the filter. As a result, the captured particulate matter can be maintained at a higher average temperature and can be subjected to higher peak operating temperatures so that the captured particulate matter may be periodically or continually oxidised to carbon dioxide and water vapour.

A further aspect of the present invention provides a variable geometry turbine comprising: a housing; a turbine wheel supported within said housing for rotation about a turbine axis; an annular inlet passage within said housing upstream of said turbine wheel and defined between respective radial inlet surfaces of first and second wall members; an outlet passage within said housing downstream of said turbine wheel; an array of vanes extending across the inlet passage, said vanes being connected to said first wall member; at least one of said first and second wall members being moveable along the turbine axis to vary the size of the inlet passage and/or at least one of said vanes being rotationally moveable about an axis that is substantially parallel to said turbine axis to vary the size of the inlet passage; wherein at least one catalyst is provided within said housing at a location such that said catalyst can be contacted by exhaust emissions flowing through said turbine during use.

In this aspect of the present invention, any desirable type of catalyst may be employed including, but not limited to, catalysts of the kind described above which catalyse the conversion (e.g. oxidation) of particulate matter (e.g. soot) into other species (e.g. gaseous carbon dioxide and water) which can more easily pass or flow out of the housing than the particulate matter under normal operating conditions of the turbine. The catalyst may be adapted to convert non-particulate matter (e.g. $CO_{(g)}$ and/or $NOx_{(g)}$) into other species (e.g. $CO_2$, $H_2O$, $N_2$ and $O_2$). The catalyst may comprise a material of the kind currently employed in conventional catalytic converters, such as a platinum group metal, with or without a washcoat containing, for example, silica and/or alumina. The catalytic material may incorporate any of the species mentioned above in respect of the previous aspect of the present invention, for example the catalyst may incorporate an alkali metal, alkaline earth metal, transition metal, lanthanide or actinide, or compounds or combinations thereof.

Other advantageous and preferred features of the invention will be apparent from the following description.

Specific embodiments of the present invention will now be described, by way of example only, with reference to the accompanying drawings, in which:

FIG. 7b is a cross-sectional view of the particulate filter of FIG. 7a;

Figure 10:
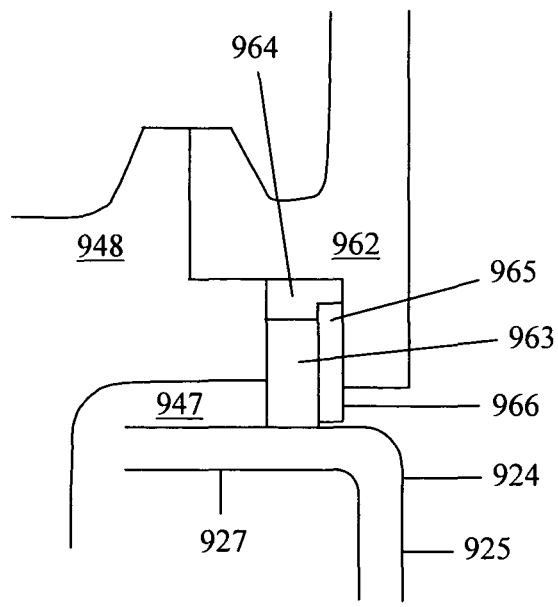
Figure 11:
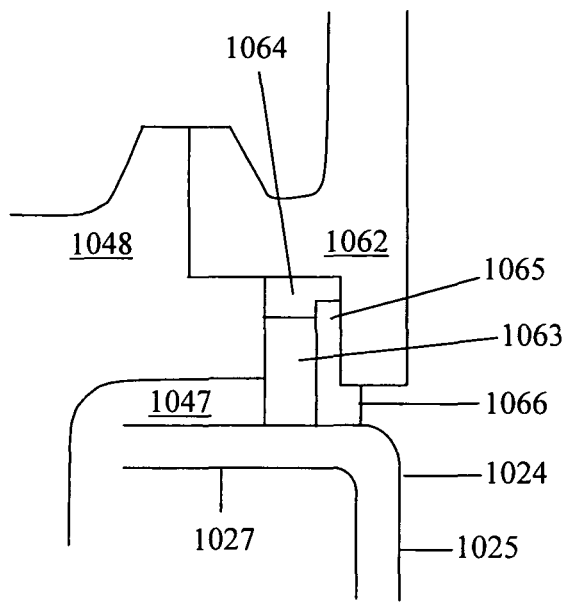

FIG. 10 is a schematic cross sectional view of a section of an upper portion of a nozzle ring and turbocharger bearing and turbine housing forming part of a variable geometry turbocharger according to another embodiment of the present invention; and FIG. 11 is a schematic cross sectional view of a section of an upper portion of a nozzle ring and turbocharger bearing and turbine housing forming part of a variable geometry turbocharger according to a still further embodiment of the present invention.

Figure 1:
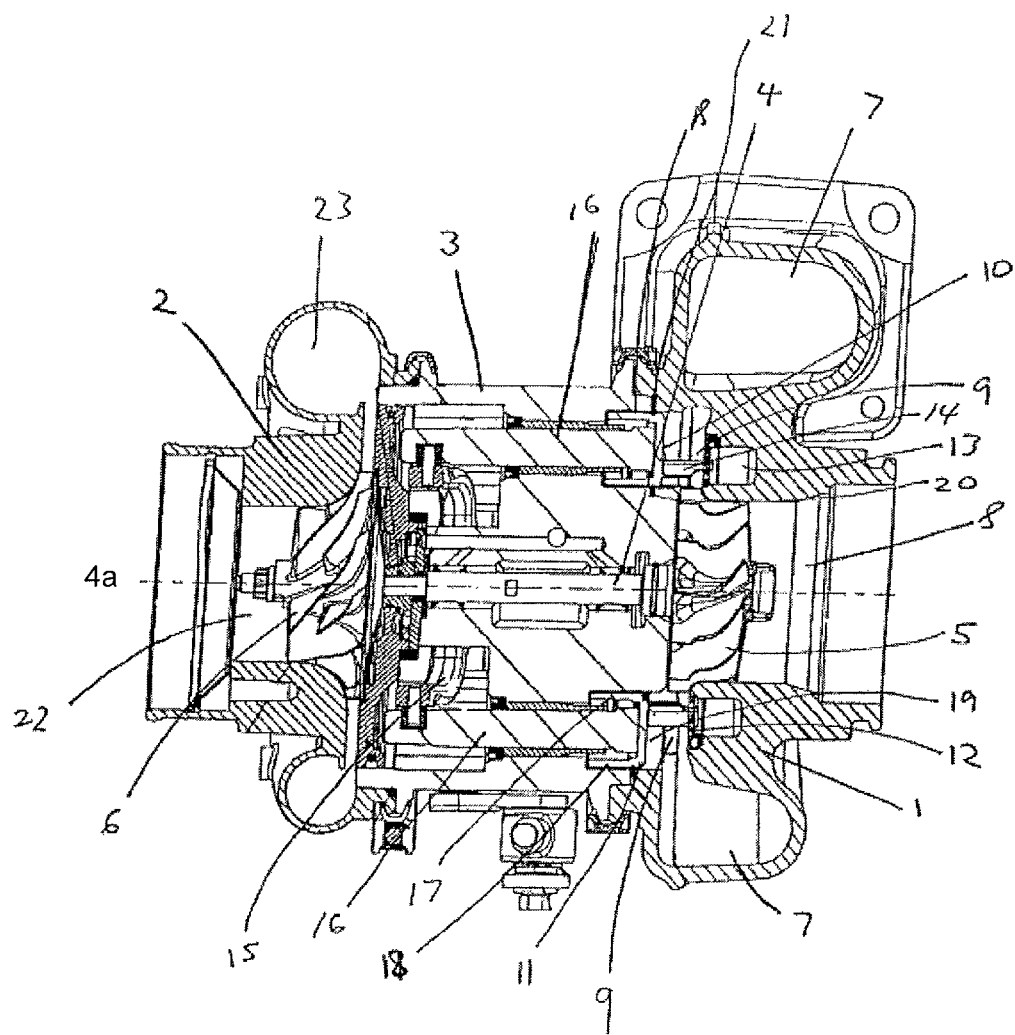
FIG. 1 is an axial cross-section through a known variable geometry turbocharger.

Referring to FIG. 1, this illustrates a known variable geometry turbocharger comprising a housing comprised of a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4a on bearing assemblies located in the bearing housing 3.

The turbine housing 1 defines an inlet volute 7 to which gas from an internal combustion engine (not shown) is delivered. The exhaust gas flows from the inlet volute 7 to an axial outlet passage 8 via an annular inlet passage 9 and the turbine wheel 5. The inlet passage 9 is defined on one side by a face 10 of a radial wall of a movable annular wall member 11, commonly referred to as a "nozzle ring", and on the opposite side by an annular shroud 12 which forms the wall of the inlet passage 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passage 9. The vanes 14 are orientated to deflect gas flowing through the inlet passage 9 towards the direction of rotation of the turbine wheel 5. When the nozzle ring 11 is proximate to the annular shroud 12, the vanes 14 project through suitably configured slots in the shroud 12, into the recess 13.

The position of the nozzle ring 11 is controlled by an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending actuating rods 16 that support the nozzle ring 11. Accordingly, by appropriate control of the actuator (which may for instance be pneumatic or electric), the axial position of the rods 16 and thus of the nozzle ring 11 can be controlled. The speed of the turbine wheel 5 is dependent upon the velocity of the gas passing through the annular inlet passage 9. For a fixed rate of mass of gas flowing into the inlet passage 9, the gas velocity is a function of the width of the inlet passage 9, the width being adjustable by controlling the axial position of the nozzle ring 11. FIG. 1 shows the annular inlet passage 9 fully open. The inlet passage 9 may be closed to a minimum by moving the face 10 of the nozzle ring 11 towards the shroud 12.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet volute 7 to the outlet passage 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown).

The above-described turbocharger may be modified for certain applications by the provision of axially extending balancing holes (not shown) in the radial wall of the nozzle ring 11 to balance the pressure within the nozzle ring cavity 19 with the pressure applied to the nozzle ring face 10 by gas flow through the inlet passage. The turbocharger may also include radially extending holes (not shown) in the axially extending flanges 17, 18 of the nozzle ring 11 to provide a bypass path for exhaust gas to flow through the nozzle ring cavity 19, bypassing the inlet passage, as the nozzle ring 11 nears the fully closed position and thereby prevent excessive pressures building up in the engine cylinders and avoid excessive heat generation during engine braking.

Figure 2:
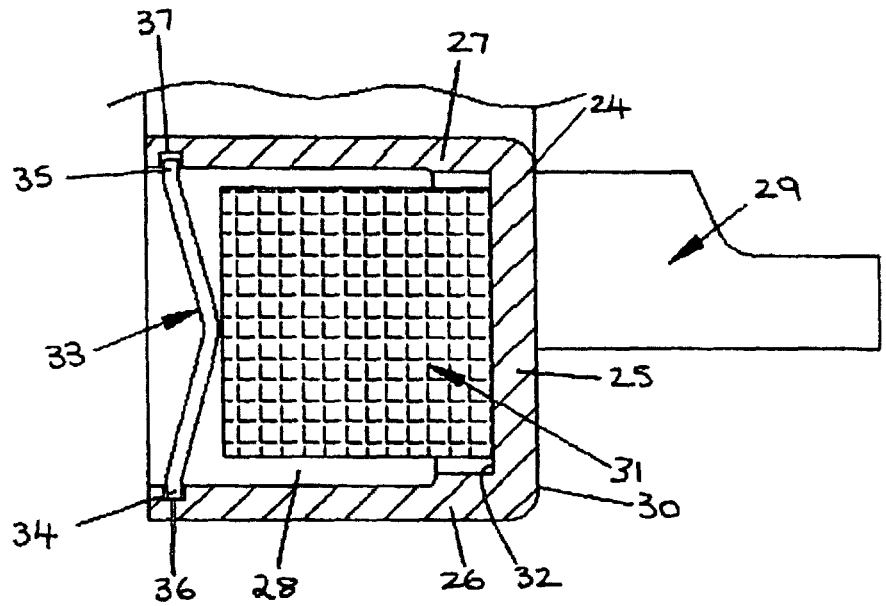
FIG. 2 is an axial cross-section through an upper portion of a nozzle ring according to an aspect of the present invention for use in a variable geometry turbocharger according to the present invention.

Referring to FIG. 2 in a first embodiment of a nozzle ring according to the present invention, which may be used in a turbocharger of the kind described above in relation to FIG. 1, the nozzle ring 24 comprises a radial wall 25 and radially inner and outer axially extending flanges 26, 27 which together define an annular space 28 behind the radial wall 25 of the nozzle ring 24. An array of axially extending vanes 29 of similar form to the vanes 14 described above in relation to FIG. 1 extend from a radial face 30 of the radial wall 25 of the nozzle ring 24.

In a modification to the nozzle ring 11 depicted in FIG. 1, the nozzle ring 24 of FIG. 2 is provided with a block of diesel particulate filter (DPF) material 31 comprising a silicon carbide honeycomb scaffold with a layer of platinum and a base metal catalyst. The DPF block 31 is secured against a radial face 32 of the radial wall 25 of the nozzle ring 24 by a spring clip 33 whose radially inner and outer ends 34, 35 are received in respective annular grooves 36, 37 formed in the radially inner and outer flanges 26, 27 of the nozzle ring 24.

During use, the nozzle ring 24 will be contacted by exhaust emissions passing through the inlet passage of the turbocharger in which the nozzle ring 24 is used. The exhaust emissions will contain many different substances, including gases and particulates. One of the primary particulate components of exhaust emissions is a carbonaceous matter, i.e. soot. During use of the turbocharger deposits of particulate matter, such as soot, can build up on surfaces within the turbocharger housing, including components of the nozzle ring 24.

Some designs of nozzle ring incorporate axially extending balancing holes in the radial wall of the nozzle ring (not shown in FIG. 2, but visible in FIG. 5 described below) and/or radially extending holes in the radially inner and outer axially extending flanges (not shown) to afford a turbocharger inlet bypass path for exhaust emissions. In such cases, exhaust emissions carrying particulates can flow out of the turbocharger inlet passage into the annular cavity behind the radial wall of the nozzle ring. The accumulation of particulate matter within this annular space is particularly undesirable since it may coat nozzle ring actuator rods, bushes and sealing rings, which can lead to sticking of the nozzle ring and/or a reduction in the available stroke of the nozzle ring during operation.

The above potential problems are overcome in the nozzle ring according to the present invention depicted in FIG. 2 by the provision of the block of DPF material 31 in the annular space 28. The block of DPF material 31 captures particulate matter flowing through the annular cavity 28 and then facilitates oxidation of the particulate matter to relatively harmless gaseous carbon dioxide and water while the temperature within the DPF block 31 is sufficiently high (e.g. 200° C. and above) to support the oxidation process. In certain applications it is envisaged that during operation of the turbine the DPF catalyst 31 will almost always be at a sufficiently high temperature to enable the oxidation process to take place. In such applications it is envisaged that the DPF catalyst 31 will be continually converting particulate matter to gaseous carbon dioxide and water, which can then easily flow out of the annular space 28, past the turbine wheel and out of the turbocharger outlet, thereby avoiding the potentially deleterious effects of the build up of particulate deposits within the turbine.

It will be appreciated that provision of a diesel particulate filter further upstream in the exhaust emission flow path (i.e. providing a diesel particulate filter closer to the engine found in conventional systems) will reduce or possibly avoid the need for a diesel particulate filter further downstream. Commonly, diesel particulate filters used in current systems require periodic regeneration to ensure the filter continues to operate efficiently throughout the lifetime of the engine and exhaust system. A number of different regeneration methods are employed, some of which require the injection of a small portion of fuel to encourage burning off of particulate material retained by the filter. This is necessary because the operational temperature of conventional diesel particulate filters towards the downstream end of the exhaust system can be below the optimum working temperature of the filter. It will be appreciated that by providing a diesel particulate filter further upstream, where operational temperatures are typically higher, removes or at least reduces the need for conventional filter regeneration processes.

In the embodiment of the nozzle ring 24 described above in respect of FIG. 2, a DPF material is employed comprised of a silicon carbide honeycomb scaffold with a layer of platinum and a base metal catalyst deposited on the scaffold. It will be appreciated that this is only one example of a material that could be employed. Other suitable catalytic materials could be based on a Corning cordierite, incorporating different loadings of platinum and base metal oxides, sintered metal materials, or filters incorporating metal foil substrates such as the diesel-oxycat filter marketed by Bosal (UK) Ltd which incorporates a stacked corrugated metal flow substrate. Moreover, the catalytic material may incorporate one or more alkali metal (e.g. potassium, caesium etc), alkaline earth metal (e.g. magnesium, strontium etc), transition metal, lanthanide or actinide (e.g. iron, cobalt, cerium etc), or compounds (e.g. oxides, nitrates etc) or combinations thereof. For example, the catalytic material may include one of more compound or alloy selected from the group consisting of MgO, $CeO_2$, $CO_3O_4$, $Sr(NO_3)_2$, Co—Sr, Co—Sr—K, Co—$KNO_3$—$ZrO_2$, $K_2Ti_2O_5$, Co—$ZrO_2$ and the like.

In applications where the operating temperature of the particulate filter is often likely to be sufficiently high to facilitate aerial oxidation of particulate matter, the particulate filter may not need to be provided with a catalyst, but may just include a material of sufficiently high surface area to allow aerial oxidation to take place. As and when the operational temperature of the high surface area material exceeds the combustion temperature of the particulate matter, the particulate matter retained within the high surface area material will be burned-off and oxidised to gaseous waste products which can then easily flow out of the turbine outlet. The high surface area material could be formed from any appropriate material such as wire, fibre mesh, one or more sintered powders, an iron based alloy such as stainless steel, a nickel based alloy such as a hastaloy, and/or a ceramic such as a magnesium based cordierite-like material.

The density of the material used in the particulate filter can be chosen to suit a particular application. It is envisaged that if, for example, wire mesh was to be used in a non-catalyst containing particulate filter then a density of around 20 to 50%, more preferably around 35%, wire mesh may be appropriate. If a wire or fibrous material is used the thickness and length of the material can be selected to suit a particular application. By way of example, the wire/fibre may have a thickness of up to around a few millimeters or more and may have a length of up to around 10 to 60 meters or more. Particularly preferred dimensions are a thickness of around 0.1 to 0.5 mm, still more preferably around 0.15 to 0.35 mm, and a length of around 20 to 50 m, more preferably around 30 to 40 m and most preferably around 37 m. If, for example, steel wire were used then 37 m of 0.35 mm wire would provide the filter with a surface area of around 35-45,000 mm$^2$, a volume of around 3-4,000 mm$^3$ and a weight of around 25-35 g. Such a filter may, for example, be suitable for use with a turbine wheel having a diameter of around 80-90 mm. It may be desirable to scale the physical properties of the wire/fibre used in relation to changes in the diameter of the turbine wheel to allow appropriate design of a filter for use with larger or small turbine wheel than has been used and tested previously. While the inventors do not wish to be bound by any particular theory, it is anticipated that one way to achieve this might be to scale the weight or volume of the filter material as the cube of the turbine wheel diameter and/or scale the surface area of the filter material as the square of the turbine wheel diameter. It will also be appreciated that the mechanical properties of the material for the particulate filter in a high vibration environment will be an important consideration in selecting a suitable material or combination of materials.

Figure 3:
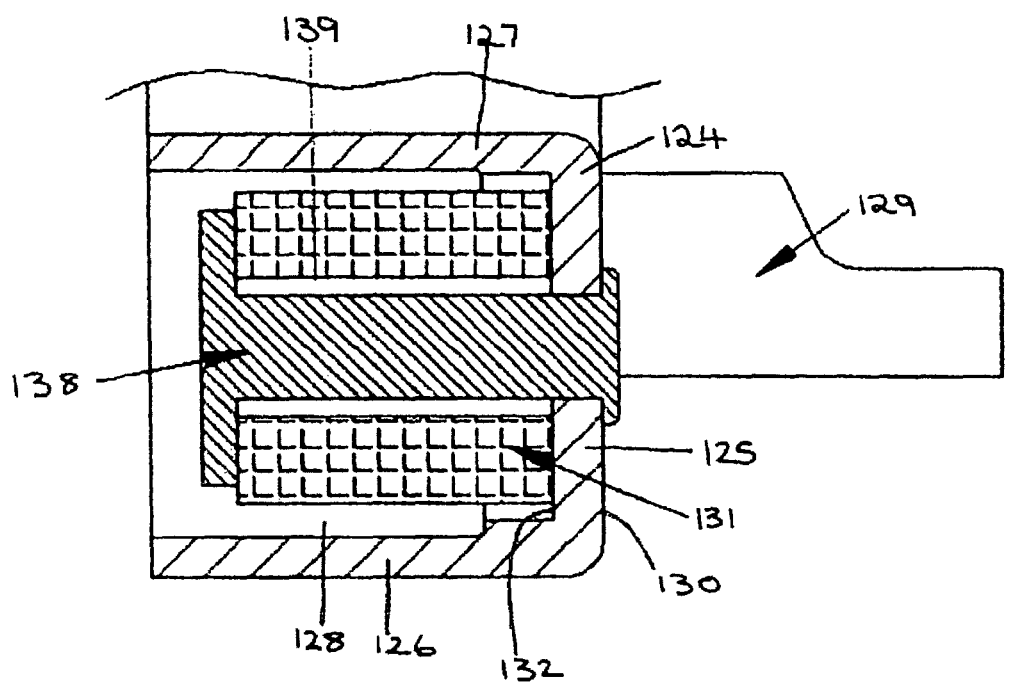
FIG. 3 is an axial cross-section view of an upper portion of an alternative embodiment of a nozzle ring according to an aspect of the present invention for use in a variable geometry turbocharger according to the present invention.

FIG. 3 shows an alternative embodiment of the nozzle ring 24 described above in relation to FIG. 2. A nozzle ring 124 shown in FIG. 3 incorporates many of the same features as the nozzle ring 24 of FIG. 2 and so corresponding reference numerals are used in FIG. 3 to refer to similar parts but increased by 100. An important difference between the embodiment of the nozzle ring 124 shown in FIG. 3 and that shown in FIG. 2 is the manner by which a block of DPF material 131 is retained against the nozzle ring 124. In the embodiment shown in FIG. 3, the block of DPF material 131 is secured against a radial face 132 of the nozzle ring 124 by a series of rivets 138 which are received through axially extending bores 139 formed in the block of filter material 131.

Figure 4:
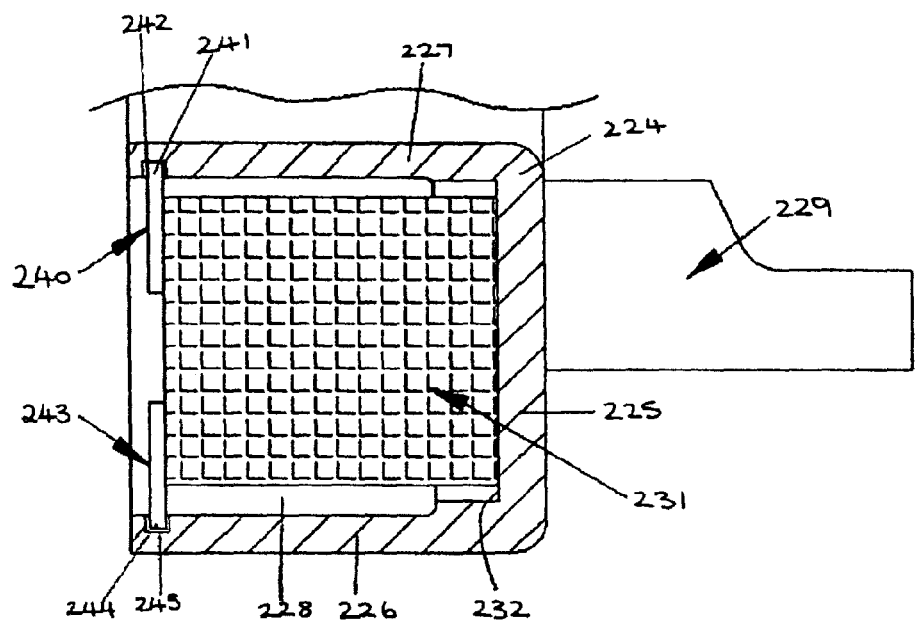
FIG. 4 is an axial cross-sectional view of an upper portion of a further alternative embodiment of a nozzle ring according to an aspect of the present invention for use in a variable geometry turbocharger according to the present invention.

FIG. 4 shows a further alternative embodiment of the nozzle ring 24 of FIG. 2, in which a nozzle ring 224 shares many features with the nozzle ring 24 of FIG. 2 and so similar reference numerals are used to denote parts common to the nozzle rings 24, 224 depicted in FIGS. 2 and 4 respectively save for increasing the reference numerals of FIG. 2 by 200.

The embodiment of the nozzle ring 224 depicted in FIG. 4 differs from the nozzle rings 24, 124 depicted in FIGS. 2 and 3 respectively by the way in which a block of DPF material 231 is retained within an annular space 228. In the FIG. 4 embodiment, the block 231 is retained within the annular space 228 by the use of a radially outer radially extending circlip 240 whose radially outer end 241 is received in a complementary annular channel 242 defined by a radially outer flange 227 of the nozzle ring 224 and/or a radially inner radially extending circlip 243 whose radially inner end 244 is received within a complementary annular channel 245 defined by a radially inner flange 226 of the nozzle ring 224. It will be appreciated that even though the embodiment shown in FIG. 4 incorporates both a radially outer circlip 240 and a radially inner circlip 243, this embodiment could be modified to incorporate just the radially outer circlip 240 or just the radially inner circlip 243.

Figure 5:
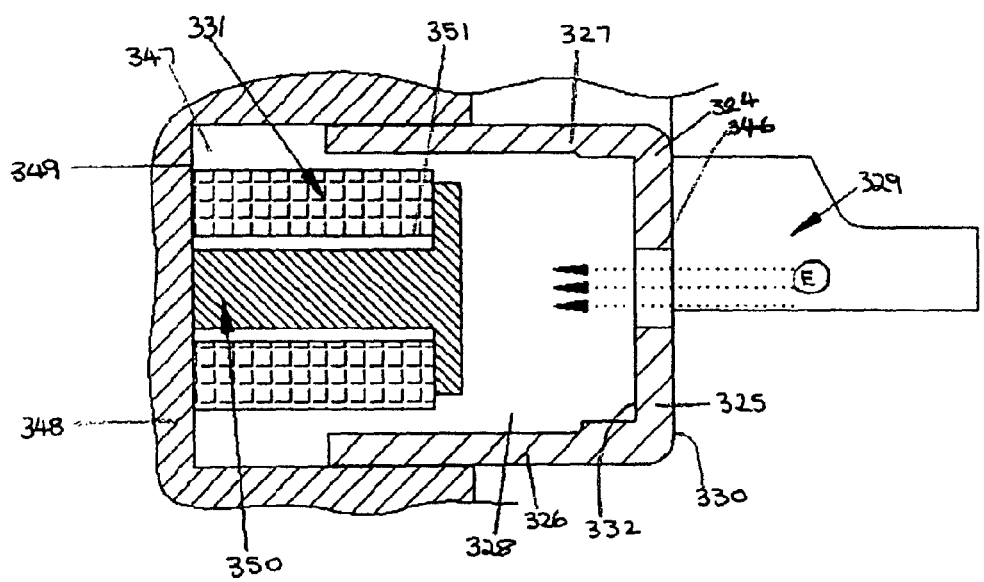
FIG. 5 is an axial cross-section view of an upper portion of a nozzle ring and turbocharger bearing housing forming part of a variable geometry turbocharger according to the present invention.

Referring now to FIG. 5, there is shown a further alternative embodiment of a turbocharger according to an aspect of the present invention. Components common to the embodiment shown in FIG. 5 and the embodiment shown in FIG. 2 take the same reference numbers but increased by 300.

In the embodiment shown in FIG. 5, a nozzle ring 324 is provided with a plurality of axially extending balance holes 346 which define an axial flow path E for exhaust emissions passing through the turbocharger inlet passage (not shown). Flow path E passes into an annular space 328 defined behind a radial wall 325 of the nozzle ring 324 and into a nozzle ring cavity 347 defined by a bearing housing 348 within which the nozzle ring 324 is slidably received to accommodate axial displacement of the nozzle ring 324 into and out of the turbocharger inlet passage. The formation of the axial flow path E by the provision of the balance holes 346 provides the opportunity for particulate matter entrained in exhaust emissions to pass behind a radial wall 325 of the nozzle ring 324 and accumulate within an annular space 328 defined by the nozzle ring 324 and/or a nozzle ring cavity 347 in the bearing housing 348. Such accumulations of particulate matter could potentially be detrimental to the ability of the nozzle ring 324 to slide within the cavity 347 in the bearing housing 348.

In the embodiment shown in FIG. 5, a block of DPF material 331 is retained against a radial face 349 of the bearing housing cavity 347 rather than being connected to the nozzle ring 324 to provide a potentially more stable mounting for the filter 331, which may be advantageous in certain applications. The filter 331 is retained in place by a series of screws 350 which are received through axially extending bores 351 defined by the block 331. It will be appreciated that any appropriate fastener could be used and that one or more of the screws 350 could be replaced with a rivet, stake or the like. Moreover, one or more retaining clips or circlips, similar to those described in relation to FIGS. 2 and 4, could also be used.

In the embodiment shown in FIG. 5, it can be seen that the fastener 350 axially overlies the balance hole 346 in the radial wall 325 of the nozzle ring 324. In this way, exhaust emissions passing through the balance hole 346 are likely to flow directly into contact with the block of DPF material 331 and be retained therein until they are oxidised and converted into gaseous carbon dioxide and water. In alternative embodiments, some of which are described below in relation to FIGS. 7a, 7b and 7c, the block 331 can define one or more formations axially overlying the balance holes 346 such that exhaust emissions following axial flow path E can be directed into and/or through the block 331 in a predetermined manner to optimise oxidation of particulates entrained within the exhaust emissions and/or to minimise or avoid disruption to exhaust emissions following flow path E. In this way little or no modification to the size or shape of the balance holes 346 will be required to accommodate the provision of the block of DPF material 331 behind the nozzle ring 324.

Figure 6:
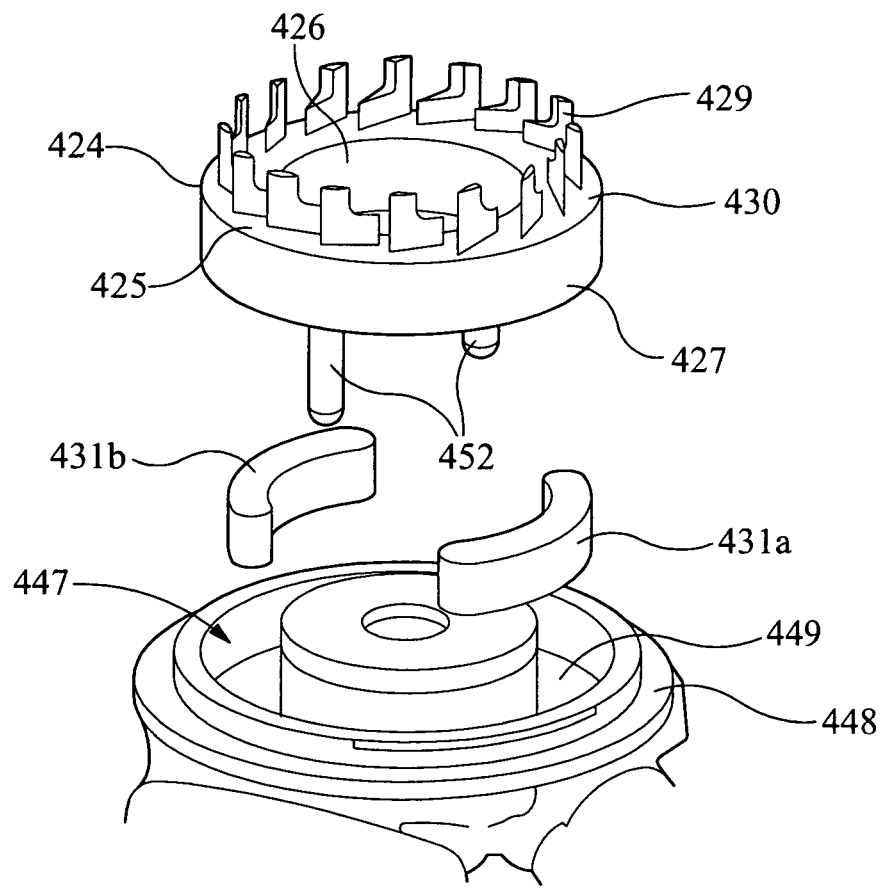
FIG. 6 is an exploded perspective view of a nozzle ring, two-part articulate filter and bearing housing forming part of a variable geometry turbocharger according to the present invention.

Referring now to FIG. 6, there is shown a perspective view of a movable nozzle ring 424, diesel particulate filter 431a, 431b and bearing housing 448 similar to those shown in FIG. 5. Components of the nozzle ring 424, filter 431a, 431b and bearing housing 448 which are similar to those components in FIG. 5 are provided with the same reference numerals save for being further increased by 100.

Figure 8:
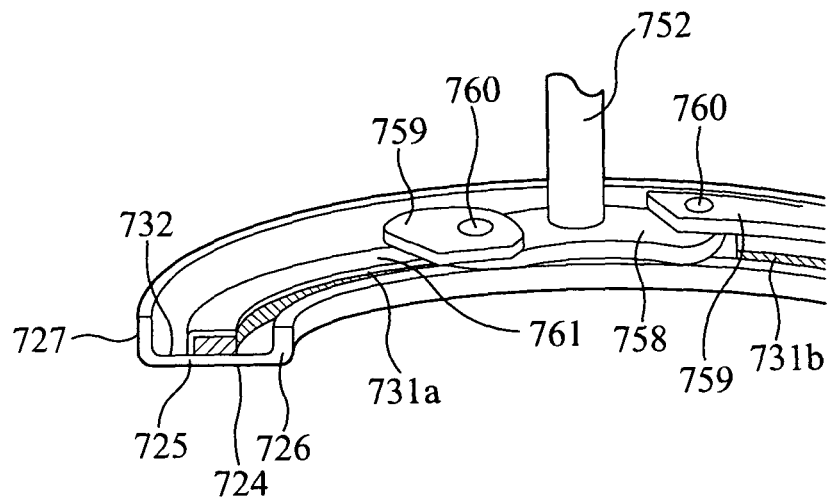
FIG. 8 is a schematic perspective view of a nozzle ring according to a further alternative embodiment of the present invention connected to a nozzle ring actuator for use in a variable geometry turbocharger according to an aspect of the present invention.

In FIG. 6 the nozzle ring 424 has a radial wall 425 and radially inner and outer flanges 426, 427 respectively extending axially from a front radial face 430 of the radial wall 425. The bearing housing 448 is provided with an annular cavity 447 which is suitably dimensioned to slidingly receive the nozzle ring 424. Between a rear radial face (not shown) of the radial wall 425 of the nozzle ring 424 and a radial face 449 of the bearing housing 448 within the annular cavity 447 there is defined an annular space of variable axial length depending upon the axial displacement of the nozzle ring 424 with respect to the bearing housing 448. Within this variable length space is received the pair of DPF blocks 431a, 431b. The blocks 431a, 4321b are in the form of arced segments having width which approximately matches the depth of the annular cavity 447 in the bearing housing 448 and whose arc length is substantially similar to the circumferential separation between a pair of actuators 452 which are connected to the rear face of the radial wall 425 of the nozzle ring 424 using a known connector assembly (not shown in FIG. 6, but an exemplary assembly is depicted in FIG. 8 described below).

While the DPF blocks 431a, 431b shown in FIG. 6 are formed as two separate arcuate blocks, it will be appreciated that the or each particulate filter may take any convenient form and that any desirable number of discrete blocks of suitable material may be provided in between the nozzle ring 424 and the bearing housing 448.

Figure 7A:
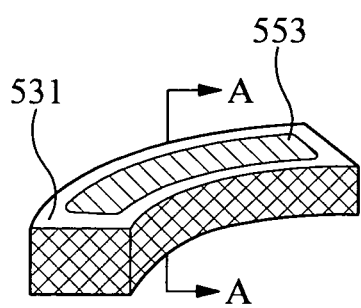
FIG. 7a is a perspective schematic illustration of a particulate filter for use in a nozzle ring and variable geometry turbocharger according to aspects of the present invention.
Figure 7B:
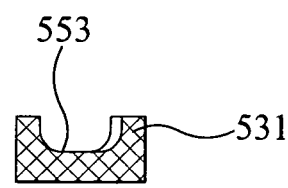
Figure 7C:
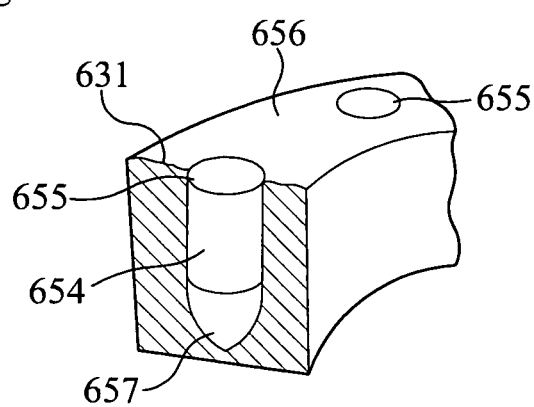
FIG. 7c is a schematic perspective view part cut away to illustrate detailed features of a particulate filter for use in a nozzle ring and variable geometry turbocharger according to aspects of the present invention.

As shown in FIGS. 7a, 7b and 7c, the blocks of the particulate filter material may be provided with any desirable formation at the surface of the block and/or extending partly or full through the thickness of the or each block. In FIGS. 7a and 7b there is shown an arcuate block of DPF material 531 in which has been formed an arcuate recess 553 extending along the arc length of the block 531. As can be seen from FIGS. 7a and 7b, the recess 553 extends approximately half way through the thickness of the block 531. In FIG. 7c a block of DPF material 631 is shown part cut away so as to illustrate one of a series of tapered bores 654 which extend from substantially circular openings 655 at an upper face 656 of the block 631 to radially inwardly tapered tails 657 lying within the body of the block 631.

One of the purposes of the recess 553 and the bores 654 in the blocks 531, 631 is to increase the surface area of each block 531, 631 available to incident exhaust emissions and also to define flow paths for exhaust emissions passing through balance holes and/or bypass apertures defined by a nozzle ring with which the blocks 531, 631 are to be used. By way of example, block 531 may be used with a nozzle ring 324 of the type described above in relation to FIG. 5 in which a plurality of balance holes 346 are defined in the radial wall 325 of the nozzle ring 324. The recess 553 may be oriented so as to axially overly one or more balance holes 346 such that the exhaust emissions following flow path E may pass through the radial wall 325 of the nozzle ring 325, and then into and along the recess 553 so as to be dispersed more evenly throughout the block of DPF material 531 than if the emissions enter the block 531 at a series of discrete locations axially overlying the balance holes 346. In an alternative embodiment, the block 531 may be replaced with the block 631 in which a plurality of tapered bores 654 are provided to axially overlie the balance holes 346 defined by the radial wall 325 of the nozzle ring 324. In this way, exhaust emissions following axial flow path E pass directly through each opening 655 in the block 631, and flow along the respective bore 654 towards its tail 657. In this way, the flow of exhaust emissions along flow path E into the block of DPF material 631 is relatively unaffected by the provision of the block 631 behind the nozzle ring 324. Accordingly, little or no modification to the balance holes 346 is required to accommodate the block of DPF material 631.

When considering the nature of any formations to be provided within the blocks of particulate filter material it is preferred that the particulate filter material should interfere as little as possible with the flow of exhaust emissions through any balance holes or radial bypass flow openings which may be provided in the nozzle ring.

With the above factors in mind, a criterion for the particulate filter material which may be taken into account is as follows:

$$P \times \left(\frac{A_S}{N}\right) \geq A_T \qquad (1)$$

where:
P=permeability of particulate filter material;
$A_S$=radial cross-sectional area of nozzle ring annular space;
N=total number of balancing holes; and
$A_T$=total radial cross-sectional area of balancing holes.

In the case of the particulate filter material underlying a specific balancing hole, a relevant criterion is as follows:

$$P \times A_M \geq A_{BH} \qquad (2)$$

where:
P=permeability of particulate filter material;
$A_M$=radial cross-sectional area of material underlying a specific balancing hole; and
$A_{BH}$=radial cross-sectional area of the specific balancing hole.

In respect of the relationships defined above in formulae 1 and 2, it is preferred that the magnitude of the left hand side component of each relationship is at least around 10% greater, more preferably around 25% greater, than the magnitude of the right hand side component of each relationship. By way of example, in formula 1 it is preferred that:

$$P \times \left(\frac{A_S}{N}\right) \geq 1.1 A_T$$

and that, in formula 2:

$$P \times A_M \geq 1.1 A_{BH}$$

The total radial cross-sectional area of balancing holes present in any particular nozzle ring is selected to suit a particular application and depends upon many different properties of the turbine components and factors influencing the intended performance of the turbine. That being said, in particular applications it has been determined that a total balance hole cross-sectional area of up to around 1000 mm² is appropriate, more preferably around 100 to 750 mm², and still more preferably around 300 to 500 mm². In one specific application a favoured total balance hole cross-sectional area was around 450 mm².

Referring now to FIG. 8, there is shown a further alternative embodiment of a nozzle ring according to an aspect of the present invention. A nozzle ring 724 comprises a radial wall 725 linking radially inner and outer axially extending flanges 726, 727 is shown connected to an axially extending actuator rod 752 via a coupling assembly consisting of an arcuate foot plate 758, a pair of washers 759 and a pair of fasteners 760 which retain the washers 759 against the foot 758 and thereby retain the actuator rod 752 against an inner radial face 732 of the nozzle ring 724. The fasteners 760 could be replaced or supplemented with any suitable type of fixing means, such as a weld. In this embodiment, arcuate blocks of DPF material 731a, 731b are secured against the inner radial face 732 of the nozzle ring 724 by the compressive force of each washer 759 acting against an arcuate retaining member 761 which in turn applies an axial force to each block 731a, 731b. It will be appreciated that each DPF block 731a, 731b may be provided with any desirable formation, such as one or more arcuate recesses or bores as described above in relation to FIGS. 7a, 7b and 7c, and that each block 731a, 731b may be formed from any of the aforementioned particulate filter materials.

Even though the DPF material is shown in FIG. 8 as being provided as two separate blocks 731a, 731b, it will be appreciated that the DPF material may be provided in a single annular ring having a profile which could cover the means by which the actuator rod 752 are connected to the nozzle ring 724 (i.e. the foot 758, washers 759 and fasteners 760). This may be desirable since it may further reduce the build up of unwanted deposits of particulate matter around the actuator rod 752 and its connecter assembly.

Figure 9:
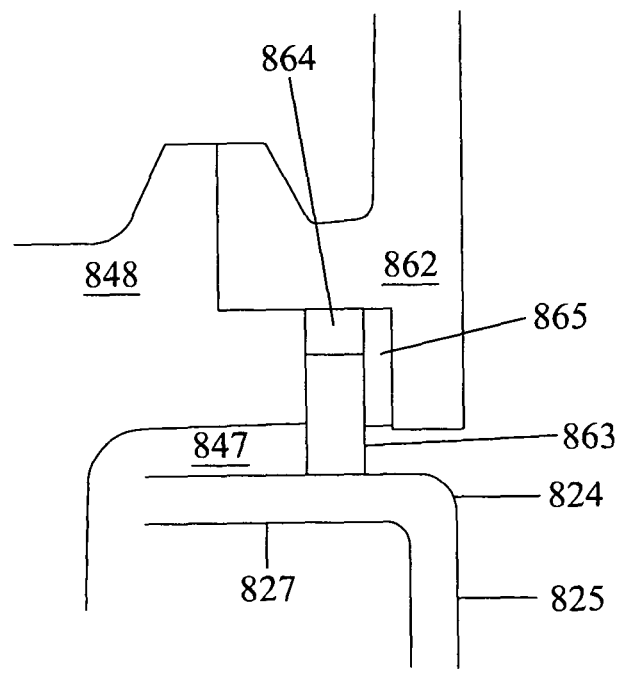
FIG. 9 is a schematic cross sectional view of a section of an upper portion of a nozzle ring and turbocharger bearing and turbine housing forming part of a variable geometry turbocharger according to a further embodiment of the present invention.

FIGS. 9, 10 and 11 show three further embodiments of a turbine according to the present invention. FIG. 9 shows a radially outer section of a nozzle ring 824 which has a radial wall 825 from which a radially inner flange (not shown) and a radially outer flange 827 extend axially towards the bearing housing 848. The bearing housing 848 is connected to the turbine housing 862 so as to define an annular cavity 847 which is suitably dimensioned to slidingly receive the nozzle ring 824. In common with the turbine depicted in FIG. 1, the turbine in FIG. 9 is provided with a radially inner sealing ring (not shown) and a radially outer sealing ring 863 to seal the nozzle ring 824 with respect to inner and outer annular surfaces of the annular cavity 847 respectively, whilst allowing the nozzle ring 824 to slide within the annular cavity 847. The outer sealing ring 863 is supported within an annular groove 864 formed in the radially outer annular surface of the cavity 847 between the bearing housing 848 and turbine housing 862 and bears against the outer annular flange 827 of the nozzle ring 824. The embodiment shown in FIG. 9 differs from that shown in FIG. 1 in that a block of DPF material 865 is provided within the annular groove 864 axially adjacent to the outer sealing ring 863. A similar block of DPF filter material may also be provided adjacent to the inner sealing ring not visible in FIG. 9. In this way, the filters 865 can catch particular matter flowing past the nozzle ring 824 towards the annular cavity 847. Particulate matter retained within the filters 865 is then supported closer to hotter exhaust emissions passing through the turbine housing 862 and further from the cooler surfaces of the turbine and bearing housings 862, 848 which should increase the likelihood of such matter being periodically oxidised to carbon dioxide and water and therefore reduce the build up of unwanted particulate deposits around the inner sealing ring (not shown) and outer sealing ring 863.

In the embodiments shown in FIGS. 10 and 11, like parts to those described above in relation to FIG. 9 are provided with similar reference numbers save for being increased by 100 and 200 respectively. In FIGS. 10 and 11, the blocks of DPF material 965, 1065 are larger than the block 865 shown in FIG. 9 such that they extend radially inwards into the annular cavity 947, 1047 so that a radial face 966, 1066 of each filter 965, 1065 is exposed to exhaust emissions flowing axially towards the annular cavity 947, 1047. In this way, the filters 965, 1065 in the embodiments shown in FIGS. 10 and 11 may catch a greater quantity of particulate matter flowing through the turbine housing 962, 1062. As can be seen from a comparison of FIGS. 10 and 11, the filter 965 in the embodiment shown in FIG. 10 extends across substantially the full radial width of the annular cavity 947 so as to contact the radially outer flange 927 of the nozzle ring 924, whereas the filter 1065 in FIG. 11 stops short of the radially outer flange 1027 of the nozzle ring 1024 so as to leave a small clearance between the flange 1027 and the filter 1065. As in the embodiment shown in FIG. 9, blocks of DPF material may also be provided adjacent to radially inner sealing rings provided in the embodiments shown in FIGS. 10 and 11. The purpose of the filters 965, 1065 axially adjacent to the outer sealing rings 963, 1063 and the optional filters (not shown) adjacent to the inner sealing rings are the same as those described above in relation to FIG. 9.

In addition to using a screw, rivet or clip to hold blocks of DPF material against a nozzle ring and/or section of the turbocharger housing, it will be appreciated that the nozzle ring and/or appropriate section of the turbocharger housing may be provided with suitable surface formations, such as ribs, to provide a friction fit between the nozzle ring/housing and the block of DPF material.

It will also be appreciated that use of the term "block" throughout the description to refer to the particulate filter material is not intended to be limiting in any way and has been used for convenience only. Any desirable size and/or shape of particulate filter material may be used, including for example, thin sheets or films of material. Moreover, although primarily mechanical means of fixing the particulate filter material to the nozzle ring or turbine housing have been described above, it will be appreciated by the skilled person that other means of securement are available, such as a high temperature heat resistant adhesive or the like.

In the embodiments described above a particulate filter material has been employed in a variable geometry turbine incorporating an axially movable nozzle ring. It is envisaged that provision of a particulate filter within a turbine housing may also be applied to other forms of turbine and turbocharger, such as variable turbine geometry turbochargers incorporating what are commonly referred to as "swing vanes". In swing vane turbochargers, each vane is pivotally connected to the radial face of a nozzle ring so as to be rotatable about an axis which is substantially parallel to the turbine axis. In this way, rotation of each vane adjusts the angle at which inflowing exhaust emissions impinge upon the vanes so as to allow the inlet geometry of the turbine to be adjusted. Provision of one or more particulate filters within the turbine housing of a "swing vane" turbine is just as applicable as to the provision of such materials within the housing of a variable geometry turbine incorporating an axially movable nozzle ring as described above in relation to FIGS. 1 to 8. It is anticipated that application of one or more particle filters within the housing of a swing vane turbine may avoid problems relating to the undesirable accumulation of particulate deposits in and around the swing vane mechanism (i.e. the swing vanes, swing vane actuator and/or unison ring), thereby improving the performance and reliability of such turbines.

In both swing vane turbines and turbines incorporating axially movable nozzle rings, it is anticipated that it may be advantageous to provide at least one additional particulate filter elsewhere within the turbine housing, for example within the inlet and/or outlet passage of the turbine. In particular, it is envisaged that it may be desirable to incorporate one or more particle filters into the outlet flange of the turbine. Moreover, it may be advantageous in some applications to provide one or more filters adjacent to a wastegate or its valve stem/bush if one is present in the turbine. It will be further appreciated that the present invention is equally applicable to use in multi-stage turbochargers and single-stage turbochargers of the kind described above. Thus, it may be desirable to locate one or more filters within the housing of a high or low pressure turbocharger forming part of a two-stage turbocharger. In particular, it may be preferable to provide at least one filter adjacent to (e.g. behind) a vane shroud of a low pressure turbocharger of a two-stage turbocharger where undesirable levels of particulate matter may accumulate during use.

It will be appreciated that provision of one or more particulate filters further upstream, that is, nearer to the engine from which exhaust emissions are being emitted, typically results in the exhaust emissions being hotter when they contact the particulate filter(s) located within the turbine housing in accordance with as aspect of the present invention than when the exhaust emissions enter particulate filters, such as diesel particulate filters, in conventional exhaust systems that are located significantly further downstream. In this way, the particulate filter(s) incorporated into the turbine will be functioning to oxidise undesirable particulate matter into gaseous species over a wider range of engine operating conditions. It is anticipated that under certain running conditions, once the engine and turbine have warmed up to standard operating temperatures, the particulate filter(s) will be constantly contacted by exhaust emissions at a sufficiently high temperature to afford immediate oxidation of the particulate matter to gaseous carbon dioxide and water which can then flow harmlessly out of the turbine. In this way, the present invention not only avoids or reduces the unwanted accumulation of particulate deposits within the turbine, but it also reduces or potentially removes, the need for further particulate filters (e.g. diesel particulate filters) within the exhaust system further downstream. This is beneficial not only in avoiding or at least reducing the need for a diesel particulate filter further downstream but also avoids the need for associated filter regeneration processes which, in certain applications, require injection of fuel over and above the amount of fuel needed to run the engine. The present invention may thus reduce fuel consumption and thereby improve the overall fuel efficiency of the engine.

The invention claimed is:

1. A variable geometry turbine comprising:
   a housing;
   a turbine wheel supported within said housing for rotation about a turbine axis;
   an annular inlet passage within said housing upstream of said turbine wheel and defined between respective radial inlet surfaces of first and second wall members;
   an outlet passage within said housing downstream of said turbine wheel;
   an array of vanes extending across the inlet passage, said vanes being connected to said first wall member;
   at least one of said first and second wall members being moveable along the turbine axis to vary the size of the inlet passage or at least one of said vanes being rotationally moveable about an axis that is substantially parallel to said turbine axis to vary the size of the inlet passage;
   wherein at least one particulate filter is provided within said housing at a location such that said particulate filter can be contacted by particulate matter flowing through said turbine during use; and
   wherein said first wall member defines a further radial surface opposite to said radial inlet surface and said at least one particulate filter is connected to said further radial surface; and
   wherein said first wall member comprises at least one axially extending flange which extends away from said inlet passage and towards said housing, said at least one flange defining a space behind the first wall member in which said at least one particulate filter is provided; and
   wherein said at least one axially extending flange defines one or more radially extending apertures to define radial flow path for exhaust emissions to flow behind the radial inlet surface of the first wall member during use; and
   wherein said at least one particulate filter defines one or more first openings arranged to radially overlie said one or more radially extending apertures such that said radial flow path extends through said first openings.

2. A turbine according to claim 1, wherein said one or more first openings are in fluid communication with one or more first channels defined by the at least one particulate filter such that said radial flow path extends along said first channel(s).

3. A turbine according to claim 2, wherein said one or more first channels extend through a portion of said at least one particulate filter such that said radial flow path extends through a portion of said at least one particulate filter.

4. A variable geometry turbine comprising:
   a housing;
   a turbine wheel supported within said housing for rotation about a turbine axis;
   an annular inlet passage within said housing upstream of said turbine wheel and defined between respective radial inlet surfaces of first and second wall members;
   an outlet passage within said housing downstream of said turbine wheel;
   an array of vanes extending across the inlet passage, said vanes being connected to said first wall member;
   at least one of said first and second wall members being moveable along the turbine axis to vary the size of the inlet passage or at least one of said vanes being rotationally moveable about an axis that is substantially parallel to said turbine axis to vary the size of the inlet passage;
   wherein at least one particulate filter is provided within said housing at a location such that said particulate filter can be contacted by particulate matter flowing through said turbine during use, and
   wherein said first wall member defines a further radial surface opposite to said radial inlet surface and said at least one particulate filter is connected to said further radial surface; and
   wherein said first wall member is moveable along the turbine axis to vary the size of the inlet passage and said first wall member defines at least one axially extending flange which extends into an axially extending cavity defined by the housing behind the radial inlet surface of the first wall member, at least one particulate filter being provided in said cavity; and
   wherein said at least one axially extending flange defines one or more radially extending apertures to define a radial flow path for exhaust emissions to flow behind the radial inlet surface of the first wall member during use; and
   wherein said at least one particulate filter defines one or more first openings arranged to radially overlie said one or more radially extending apertures such that said radial flow path extends through said first openings.

5. A turbine according to claim 4, wherein said one or more first openings are in fluid communication with one or more first channels defined by the at least one particulate filter such that said radial flow path extends along said first channel(s).

6. A turbine according to claim 5, wherein said one or more first channels extend through a portion of said at least one particulate filter such that said radial flow path extends through a portion of said at least one particulate filter.

7. A variable geometry turbine comprising:
   a housing;
   a turbine wheel supported within said housing for rotation about a turbine axis;
   an annular inlet passage within said housing upstream of said turbine wheel and defined between respective radial inlet surfaces of first and second wall members;
   an outlet passage within said housing downstream of said turbine wheel;
   an array of vanes extending across the inlet passage, said vanes being connected to said first wall member;

at least one of said first and second wall members being moveable along the turbine axis to vary the size of the inlet passage or at least one of said vanes being rotationally moveable about an axis that is substantially parallel to said turbine axis to vary the size of the inlet passage;

wherein at least one particulate filter is provided within said housing at a location such that said particulate filter can be contacted by particulate matter flowing through said turbine during use; and wherein said first wall member defines a further radial surface opposite to said radial inlet surface and said at least one particulate filter is connected to said further radial surface; and wherein said radial inlet surface of said first wall member defines one or more axially extending apertures which define an axial flow path for gas to flow through the first wall member during use; and wherein said at least one particulate filter defines one or more openings arranged to axially overlie said one or more axially extending apertures such that said axial flow path extends through said openings.

8. A turbine according to claim 7, wherein said one or more openings are in fluid communication with one or more channels defined by the at least one particulate filter such that said axial flow path extends along said channel(s).

9. A turbine according to claim 8, wherein said one or more channels extend through a portion of said at least one particulate filter such that said axial flow path extends through a portion of said at least one particulate filter.

* * * * *